United States Patent [19]

Altmaier et al.

[11] Patent Number: 5,471,503
[45] Date of Patent: Nov. 28, 1995

[54] SCANNING METHOD FOR RECEIVING A TRANSMISSION IN A COMMUNICATION SYSTEM WITH SLOW FREQUENCY HOPPING AND CODING

[75] Inventors: Paulette R. Altmaier, Cupertino; Peter J. Potrebic, Mountain View, both of Calif.

[73] Assignee: Apple Computer, Inc., Cupertino, Calif.

[21] Appl. No.: 997,880

[22] Filed: Dec. 29, 1992

[51] Int. Cl.⁶ .................................................. H04B 1/713
[52] U.S. Cl. ................................................................ 375/202
[58] Field of Search ........................ 375/1, 202; 370/95.1

[56] References Cited

U.S. PATENT DOCUMENTS

| | | | |
|---|---|---|---|
| 4,267,592 | 5/1981 | Craiglow | 375/1 |
| 4,271,524 | 6/1981 | Goodman et al. | 375/1 |
| 4,638,493 | 1/1987 | Bishop et al. | 375/1 |
| 4,866,710 | 9/1989 | Schaeffer | 370/95.1 |
| 5,029,183 | 7/1991 | Tymes | 375/1 |
| 5,048,057 | 9/1991 | Saleh et al. | 375/1 |
| 5,079,768 | 1/1992 | Flammer | 375/1 |
| 5,081,641 | 1/1992 | Kotzin et al. | 375/1 |
| 5,103,461 | 4/1992 | Tymes | 375/1 |
| 5,119,104 | 6/1992 | Heller | 375/1 |
| 5,193,102 | 3/1993 | Meidan et al. | 375/1 |
| 5,212,808 | 5/1993 | Su et al. | 375/1 |
| 5,224,121 | 6/1993 | Schorman | 375/1 |
| 5,239,555 | 8/1993 | Konig | 375/1 |
| 5,247,702 | 7/1993 | Su et al. | 375/1 |
| 5,311,542 | 5/1994 | Eder | 375/1 |

OTHER PUBLICATIONS

Saleh, et al., "A TDMA Indoor Radio Communications System Using Cyclical Slow Frequency Hopping and Coding—Experimental Results and Implementation Issues", IEEE Global Telecommunications Conference & Exhibition, Hollywood, Fla., Nov. 28–Dec. 1, 1988, pp. 1337–1342.

Saleh and Cimini, Jr., "Indoor Radio Communications Using Time–Division Multiple Access with Cyclical Slow Frequency Hopping and Coding", IEEE Journal on Selected Areas in Communications, vol. 7, No. 1, Jan. 1989, pp. 59–70.

Bertsekas and Gallager, "Data Networks", Prentice–Hall, Inc., 1987, pp. 240–248.

Primary Examiner—Salvatore Cangialosi
Attorney, Agent, or Firm—Blakely, Sokoloff, Taylor & Zafman

[57] ABSTRACT

A scanning method for receiving a signal in a frequency hopped communication system that transmits a packet having N segments that are encoded with an error correction code that allows recovery of a packet even if $e$ segments are erasures. A receiving station continuously scans the first $p$ ($1 \leq p \leq e+1$) channels, testing each channel for the existence of a transmission. If detected, a segment is received, and then the receiving station sequences through the remaining channels, receiving the segments if possible, and then applying error correction to the complete transmission. This technique of scanning the first several channels, receiving the first unimpaired segment, and thereby gaining the ability to recover all unimpaired segments enables the full theoretical power of a coded, slow frequency hopped system to be realized.

24 Claims, 5 Drawing Sheets

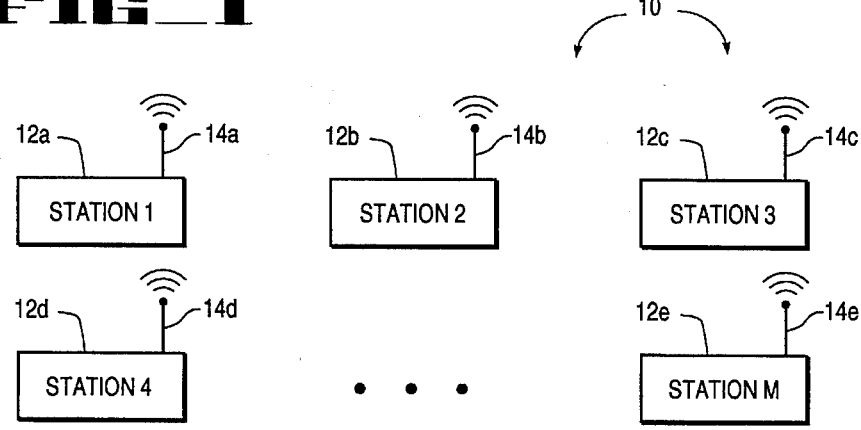
FIG_1
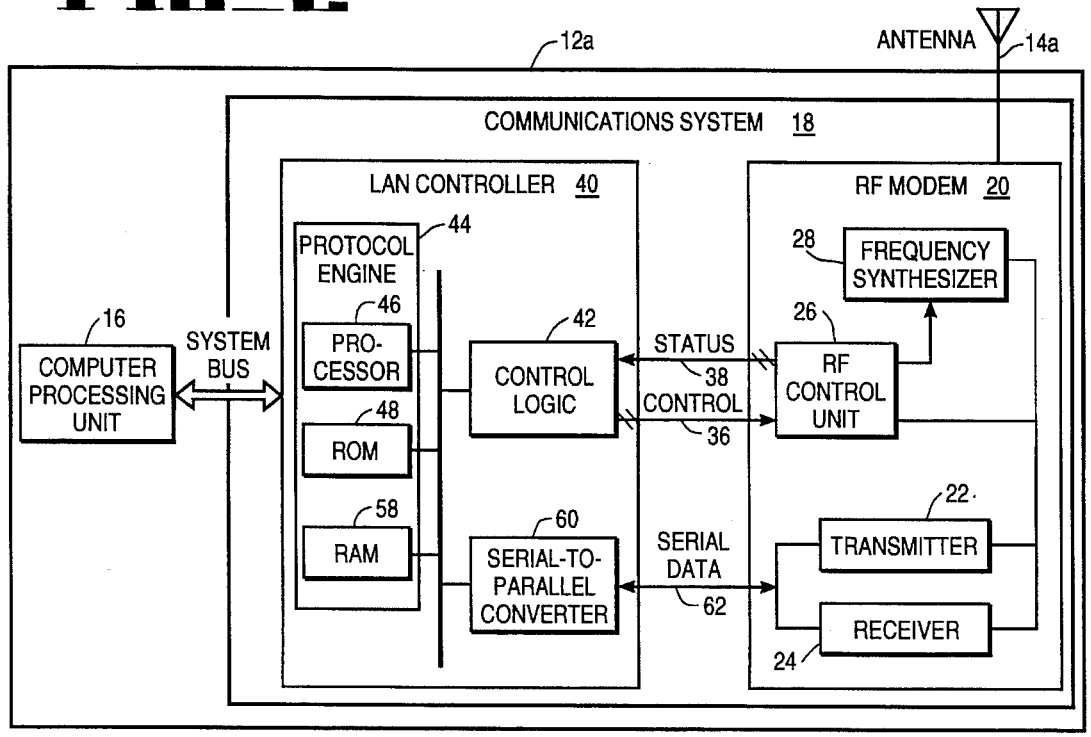
FIG_2
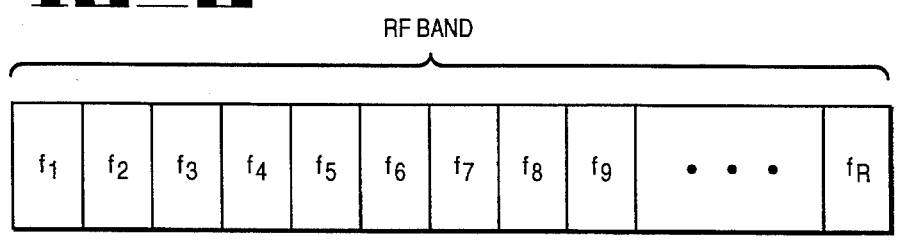
FIG_3

FIG_4
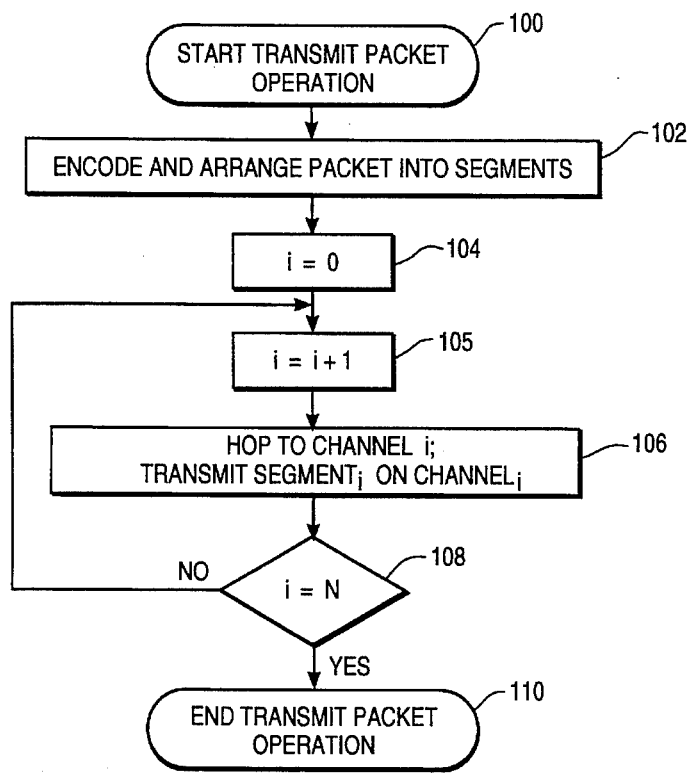
FIG_5
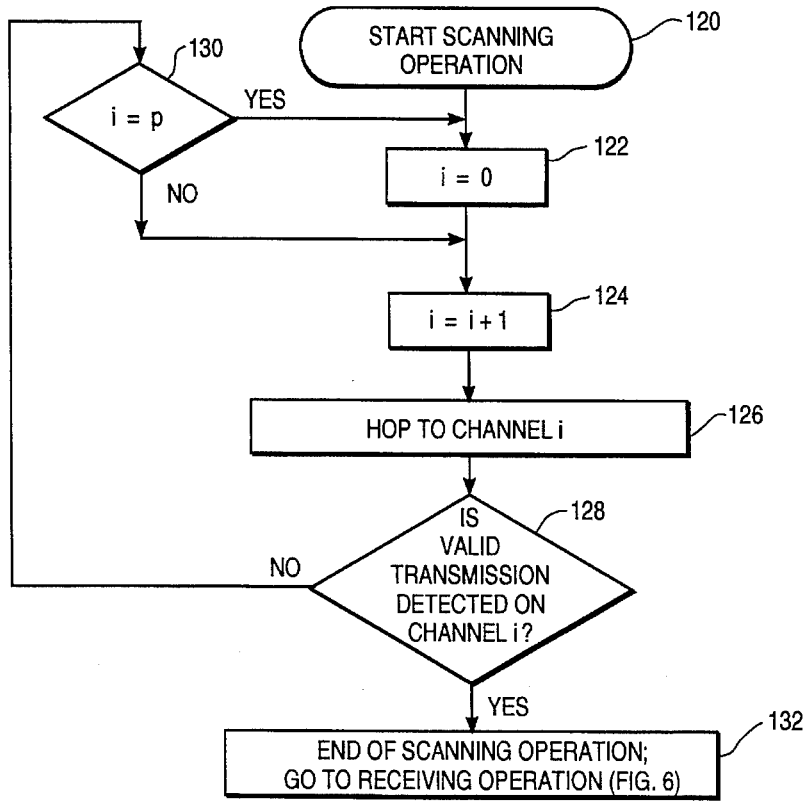

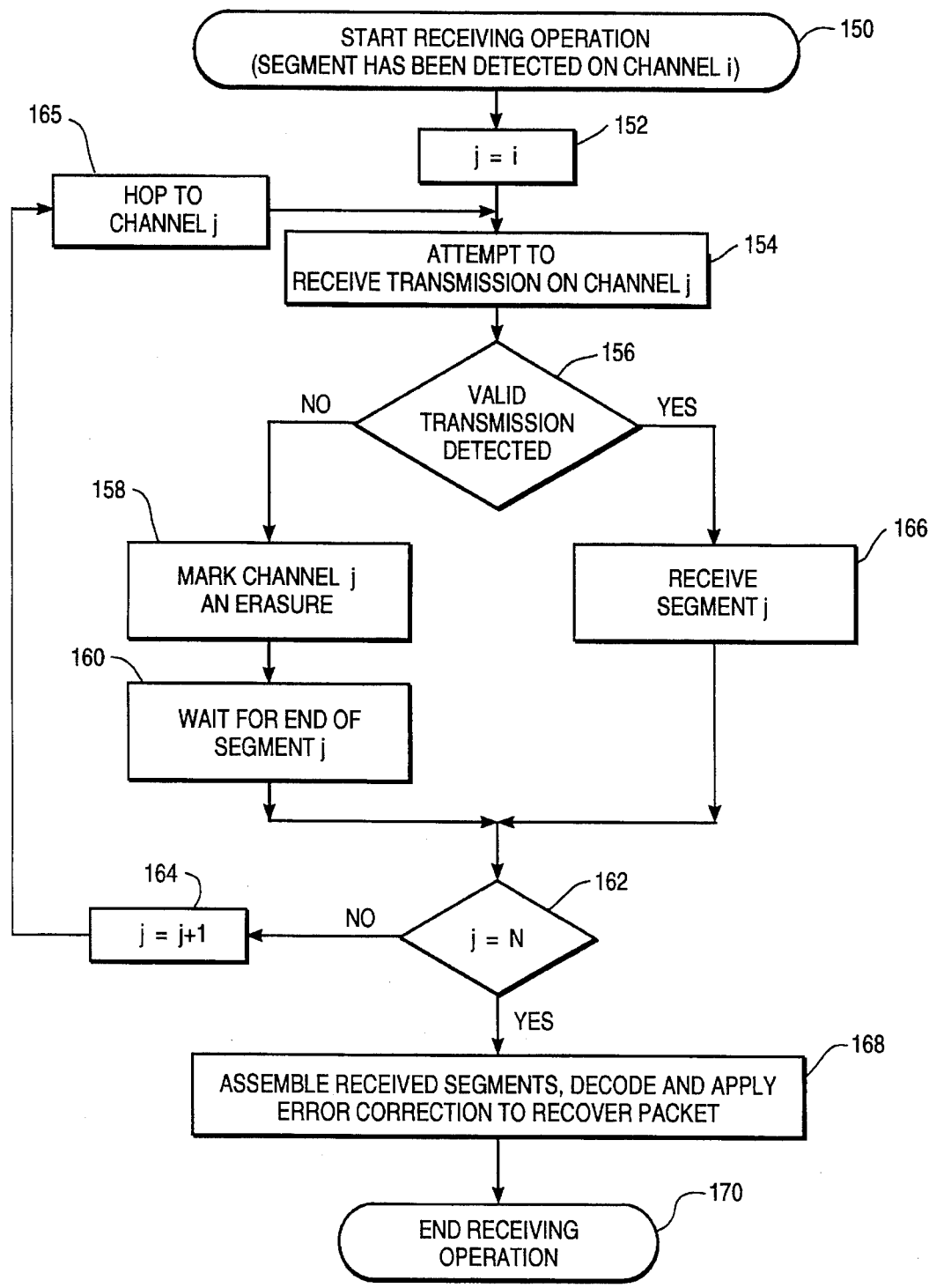

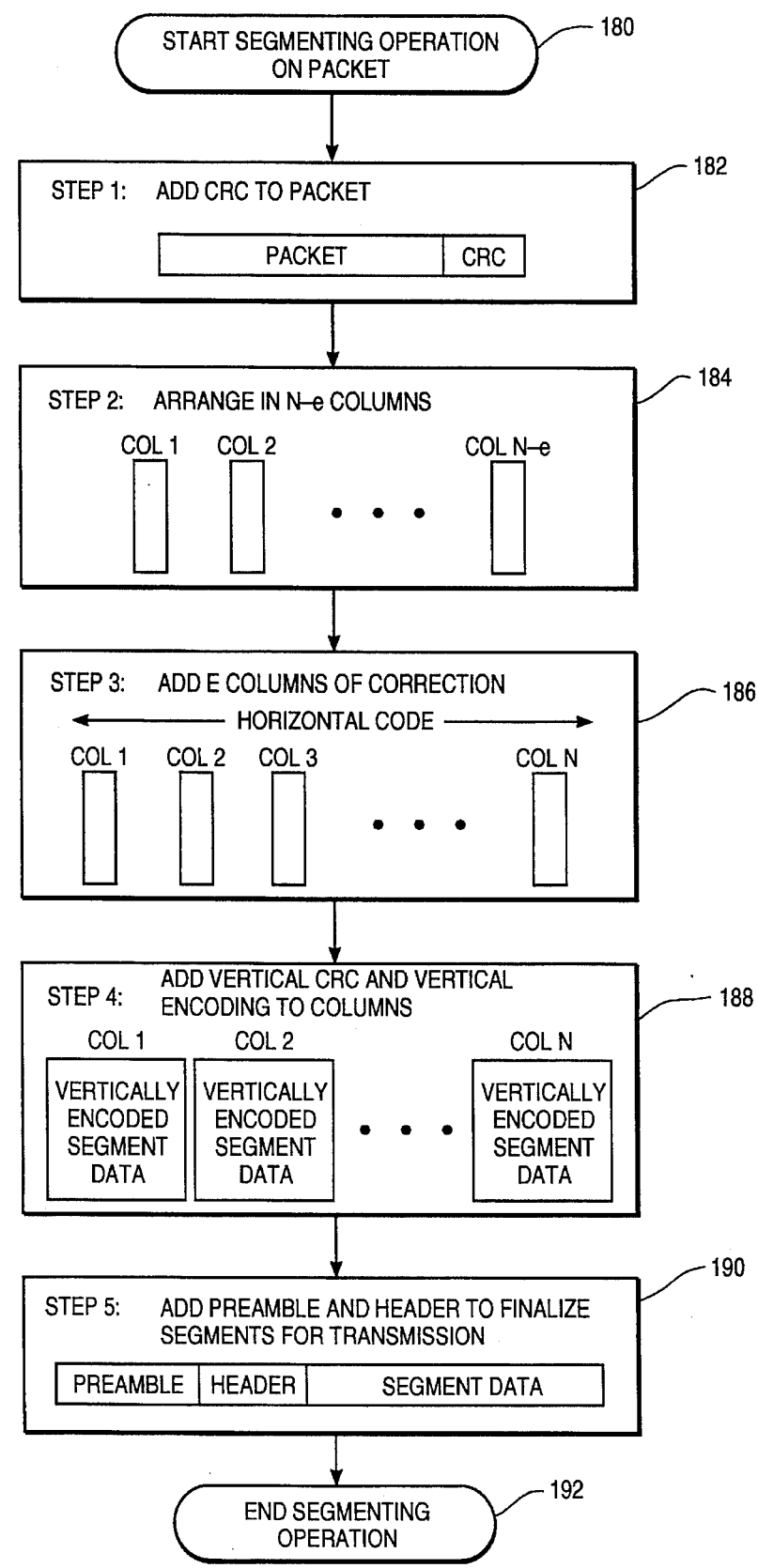

FIG_8
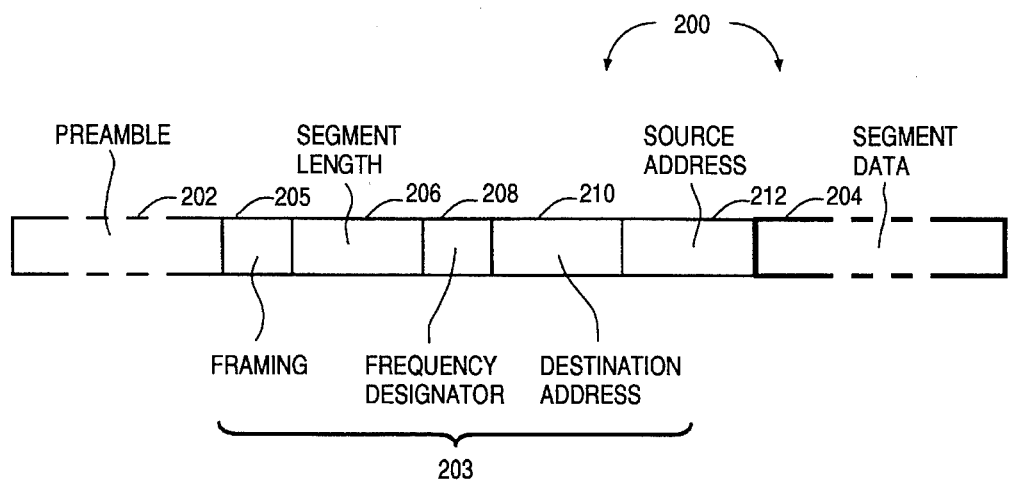
FIG_9
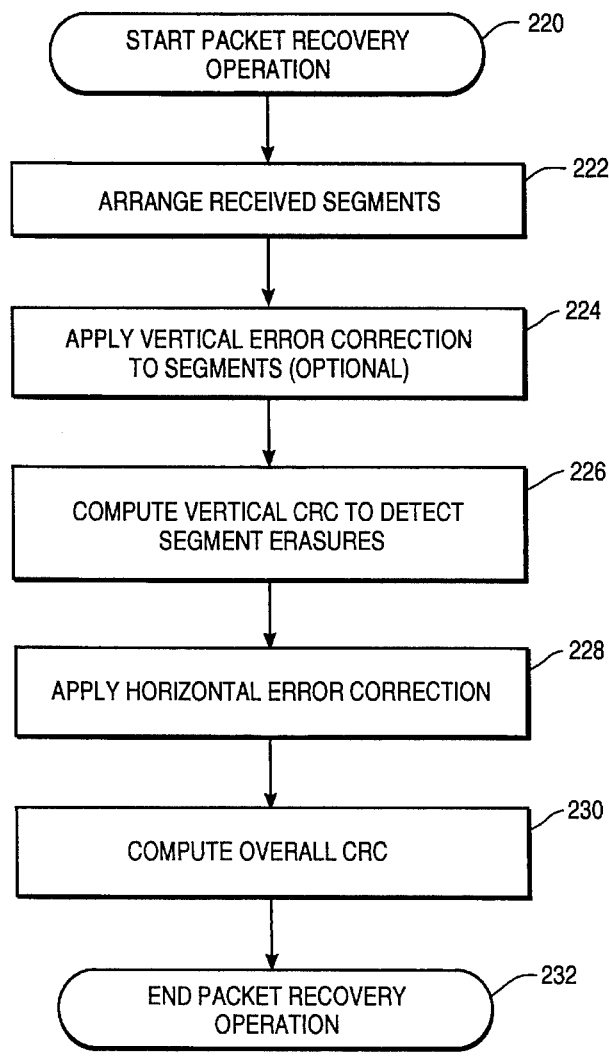

SCANNING METHOD FOR RECEIVING A TRANSMISSION IN A COMMUNICATION SYSTEM WITH SLOW FREQUENCY HOPPING AND CODING

BACKGROUND OF THE INVENTION

Field of the Invention

The present invention relates to decentralized communication systems in which the beginning time and length of transmission is unknown, and in which there may be a number of nodes (users). The present invention is useful for coded, slow frequency hopped communication systems that operate in the presence of a deep fade or interference on the first channel used for transmission.

Description of Related Art

Communication systems are designed for particular environments. One environment is a plurality of stand-alone stations that communicate directly with each other without using any master controller whose transmissions can be received by all other stations in the system. In other words, this environment is a decentralized system including two or more stations that desire to communicate with each other. Any station may be capable of communicating with only a subset of the other stations in the system, and therefore the system is completely decentralized. An example of such an environment is an indoor communication system between stand-alone computer stations using radio frequency transmissions.

To communicate, simple conventional radio systems use a single dedicated radio frequency. However, the number of available radio frequencies is limited, which is particularly a problem for multi-user systems because only one station can transmit during any given time period. The likelihood of collisions between stations that use a single frequency is also very large. Furthermore, if the single radio frequency were to experience substantial fading or interference, a not uncommon occurrence, communication would be impossible.

For multi-user systems, it has been suggested to use a number (N) of radio frequency channels that are transmitted in a particular sequence known to the receiving stations. The technique of sequencing through N channels, when combined with coding techniques to be discussed, is called "cyclical slow frequency hopping and coding", and can be a powerful technique to combat fading and interference in a wireless network. This technique is described in detail in "Indoor Radio Communications Using Time-Division Multiple Access with Cyclical Slow Frequency Hopping and Coding", by Adel A. M. Saleh and Leonard J. Cimini, Jr., *IEEE Journal on Selected Areas in Communications*, Vol. 7, No. 1, Jan. 1989, pp. 59–70.

In a system using cyclical slow frequency hopping and coding, data to be transmitted is divided into segments, and each segment is transmitted on a different carrier frequency (channel). Burst error correction is used both within and across segments when the data is re-assembled, thereby permitting the data to be correctly reconstituted even in the presence of fading or interference on one or more channels, even if up to $e$ segments out of the N are corrupted.

One problem with decentralized systems is that the receiving stations have no foreknowledge that a transmission will begin. Therefore the receiving stations do not know when to begin receiving a transmission. One important prerequisite to effective use of slow frequency hopping with coding is that the presence of a transmission must be detected with high probability. If the transmission's presence is difficult to detect, then many messages would be missed and the theoretical gains from slow frequency hopping with coding would not be realized.

Conventionally, receiving stations monitor the first channel, and when a transmission is received, they begin receiving the data and continue cycling through each of the known frequencies until the transmission is complete. One problem with monitoring the first channel is detecting the presence of the desired transmission in the presence of a deep fade or interference on the first or subsequent channels. If there were a deep fade or interference such that a transmission on the first channel could not be detected, the entire transmission would be lost even though the first channel might have been the only impaired channel. In this case, the error correction techniques that enable the transmission to be recovered even when $e$ channels are impaired would be of no value, and the system robustness would be dramatically decreased from its theoretical level.

Thus, it would be advantageous if the presence of a desired transmission could be detected and all recoverable segments received despite the presence of a deep fade or strong interference on the first channel in the sequence.

The indoor radio environment is characterized by potentially severe multipath fading, together with large propagation losses. Even with a dedicated radio frequency band, there are potentially serious problems with interference from other devices that emit radio frequency energy on the same channel during operation. Multipath fading causes the signal-to-noise ratio (SNR) vs. bit-error ratio (BER) curves to differ significantly from their free-space characteristics. It has been experimentally determined that the indoor radio environment at about 1.0 GHz can be modeled as a very slowly varying, frequency-selective, Rayleigh fading environment. The movement of people, objects, etc. within the building causes the signal amplitude at a point to be slowly varying.

One conventional medium access control (MAC) protocol for a decentralized Local Area Network (LAN), in which all nodes are peers, is a variant of Carrier Sense Multiple Access (CSMA). The channel access protocol of CSMA is simple and has low overhead. Token passing protocols, in which one or more nodes are dynamically designated as a master node on the LAN, are not suitable for this environment, given the possibility of hidden nodes and the (semi) mobile nature of the nodes on the LAN.

To avoid collisions in networks, a station employing CSMA will not transmit if it knows that another station is transmitting. This station will wait until the other's transmission is complete before beginning transmission. This system is useful for networks in which the stations are able to detect that the others are transmitting. However, this system will not avoid collisions in the presence of "hidden nodes". The "hidden node" problem results when a node is visible to one node, but not to another. A hidden node is always a problem even with friendly systems (stations using like protocols) because the hidden nodes can interfere with transmissions by other nodes, in spite of the nodes' attempts to avoid mutual interference. Suppose that there is a multi-station decentralized communication system having stations including station A and station B. These two stations cannot hear each other, and both wish to transmit. Even if station A starts transmitting well before station B, station B will not hear the transmission, and will start to transmit. All stations in the intersection of the transmission radius of the two transmitting stations will hear both signals and there will be a collision if either packet was addressed to a station within this intersection.

Unfortunately, in the presence of hidden nodes, CSMA performance degrades rapidly and significantly to ALOHA performance. Collision detect systems, such as that used in Ethernet, are not feasible in the radio environment, and would not help with hidden nodes. Collision Avoidance using state-following, as in Localtalk, is not a practical option. The Busy Tone Multiple Access method of achieving collision avoidance has large associated costs because it requires a form of full-duplex operation.

For any practical decentralized communication system, the problem of hidden nodes must be addressed. Furthermore, the effect of external interference must also be minimized.

SUMMARY OF THE INVENTION

The scanning technique described herein is useful for the general case of a decentralized environment, where no master control station is present. To reduce the possibility of collisions, and to allow packets to be transmitted from different stations in an overlapping time frame, frequency hopping is utilized. The scanning technique described herein allows effective use of frequency hopping to reduce the negative effect of fading and interference caused by unlike systems and hidden nodes on one or more radio frequency channels.

Frequency hopping is a communication technique in which a packet is encoded and arranged in segments. The segments are transmitted in a predetermined channel sequence. Suppose, for instance, the order of transmission on the N channels is $f_1, f_2, \ldots, f_N$, and that error correction techniques allow the transmission to be recovered if no more than $e$ segments out of the N are corrupted. Using prior methods, if the node listens on channel $f_1$ to detect the presence of a transmission, and if, due to fading or interference, it is impossible to recover the desired transmission on channel $f_1$, the entire transmission will be lost even if only the first channel was impaired.

Using the scanning technique of the present invention, a receiving station continuously scans the first $p (1 \leq p \leq e+1)$ channels, testing each channel for the existence of a transmission. If detected, a segment is received and then the receiving station sequences through the remaining channels, receiving the remaining segments in the packet if possible, finally applying error correction to the complete transmission. This technique of scanning the first p channels, receiving the first unimpaired segment, and thereby gaining the ability to recover all unimpaired segments enables the full theoretical power of a coded, slow frequency hopped system to be realized.

A frequency hopping communication unit is described herein for a station in a Local Area Network (LAN) that receives data and commands on a system bus. The frequency hopping communication unit includes an antenna, a radio frequency (RF) modem coupled to the antenna, and a LAN controller. The RF modem includes a frequency synthesizer for producing a plurality of RF frequencies, a RF transmitter, a RF receiver, and a RF control unit coupled to the RF transmitter and RF receiver. The RF control unit is coupled to the frequency synthesizer for selecting a radio frequency, and includes control means for controlling the frequency synthesizer so that it serially scans a predetermined number of frequencies. A data bus between the RF modem and the LAN controller couples the RF transmitter and receiver with a protocol engine in the LAN controller. The LAN controller includes control logic coupled to the RF control unit for supplying control information thereto and for receiving status information therefrom. The control logic is coupled to the protocol engine within the LAN controller, which is coupled to a system bus to receive data and commands. The protocol engine encodes a packet with error correction allowing a maximum number of erasures $e$, and arranges it into segments for transmittal. The protocol engine also decodes a received packet and recovers the packet if it is recoverable.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 1 is a block diagram illustrating a plurality of stations in a communication network.

FIG. 2 is a block diagram of circuits within each station.

FIG. 3 illustrates a RF band divided into a plurality of frequencies, each representing a channel.

FIG. 4 is flow chart of transmit operations performed by a transmitting station.

FIG. 5 is a flow chart of scanning operations performed by a listening station.

FIG. 6 is a flow chart of receiving operations performed by the receiving station after the scanning operation of FIG. 5 has been performed.

FIG. 7 is a flow chart of protocol operations used to encode and arrange the data into N segments, each box associating an operation with its effect on the data structure.

FIG. 8 is a diagram of the structure of a segment, including the preamble, header and data.

FIG. 9 is a flow chart of error correction operations in a receiving station following reception of a packet.

DETAILED DESCRIPTION OF THE PREFERRED EMBODIMENT

FIGS. 1 through 9 disclose various embodiments of the present invention for purposes of illustration only. One skilled in the art will readily recognize from the following discussion that alternative embodiments of the structures and methods illustrated herein may be employed without departing from the principles of the invention.

I. Overall Communication System

From an academic standpoint, a communication system can be treated as having many different layers. At the highest layer, the application layer, the message is sent and may be acknowledged. A message to be sent, for example a file to be sent over E-mail, can be treated as single document in the application layer, even though it may include a tremendous number of bits. The physical layer, the lowest layer, treats the message as a series of bits. Between the application layer and the physical layer, there are other layers that include techniques such as determining destination, and encoding the packets. Many communication systems divide the messages into shorter bit strings called "packets" that are individually transmitted and then reassembled into messages at the destination. Thus, packets are basic data structures for a communication system. The present invention is particularly useful for sending packets of data from one station to another, therefore the following discussion relates to sending and receiving single packets. It will be apparent to one skilled in the art that it may be necessary to transmit and receive many such packets to send a single message.

The scanning technique described herein allows detection of a coded, slow-frequency hopped transmission for the general case of a decentralized environment, where no master control station is present. Users can send arbitrary or fixed size packets.

Reference is made to FIG. 1 which illustrates a decentralized environment including a plurality of independent stations at 10. The stations 10 include a first station 12$a$ that has an antenna 14$a$, a second station 12$b$ that has antenna 14$b$, and an $M^{th}$ station 12$e$ that has an antenna 14$e$. Each station 12$a$–12$e$ is a stand-alone computer, a peripheral, or any device for which communication would be useful. Although only five stations are illustrated in FIG. 1, for many computer applications the number of stations (M) is expected to be in the range of 2–30. However, it will be apparent that in other embodiments many more stations can be accommodated; i.e., M can be very large.

II. Description of a Station

Reference is made to FIG. 2 which illustrates the station 12$a$ that includes a computer processing unit 16 and a communications system 18. The antenna 14$a$ is connected to a radio frequency (RF) modem 20 within the communications system 18. The RF modem 20 includes a conventional transmitter 22 and a conventional receiver 24. A RF control unit 26 is connected to the transmitter 22 and the receiver 24, for controlling operation therein. The transmitter 22 includes conventional circuits for modulating a frequency selected by the RF control unit 26. The receiver 24 includes conventional circuits for demodulating a received RF signal at a frequency selected by the RF control unit 26. The RF transmitter 22, receiver 24, and control unit 26 are connected to a frequency synthesizer 28 which determines the frequency received and transmitted by the transmitter 22 and receiver 24. The frequency synthesizer 28 is capable of generating frequencies $f_1, \ldots f_R$. The antenna 14$a$ is capable of receiving and sending transmissions on frequencies $f_1, \ldots, f_R$.

Reference is briefly made to FIG. 3 which illustrates a RF band that is divided into a plurality of frequencies $f_1, \ldots, f_R$. A data packet can be divided into segments, and each segment can be sent and received from the station at any of these frequencies, thus, each of the frequencies $f_1, \ldots, f_R$ can also be understood as a channel for sending and receiving data. The frequency is selected by the RF control unit 26 using control signals received on a set of control lines 36. Thus, a program in a LAN controller 40 to be described can be utilized to hop through the frequencies in a selected sequence. For example, if the RF bandwidth is 500 MHz, and each channel uses 10 MHz, then the RF band has fifty channels (R=50). The transmitted packet can be divided into a lesser number of N segments, (for example, N=8). These eight frequencies and their sequence of use would be programmed and controlled through the control lines 36 so that the frequency synthesizer 28 hops sequentially through each of those frequencies to receive a segment. The eight frequencies can include any of the fifty frequencies in any order. The same principles apply to scanning, except that fewer frequencies are scanned and the time spent at each of these frequencies is substantially less than the time necessary to receive a segment. Furthermore, for scanning, the receiver unit includes a means for detecting the presence of a transmission on the scanned frequencies. Status information is provided from the RF control unit on lines 38.

Referring still to FIG. 2, the communications system 18 includes a wireless Local Area Network (LAN) controller 40 coupled between the RF modem 20 and the computer processing unit 16. All processing of packet data takes place in the LAN controller 40. The LAN controller 40 includes control logic 42 to interface to the RF modem 20, and a protocol engine 44 that performs all operations on packets. The protocol engine 44 includes a processor 46, a Read Only Memory (ROM) 48, and a Random Access Memory (RAM) 50 to perform the communication functions prescribed for it. When a packet is to be sent, the protocol engine 44 performs steps to encode the packet and arrange it into segments, as will be described in detail.

The LAN controller 40 includes a serial-to-parallel converter 60 for passing data between the RF modem 20 and the LAN controller 40 on a serial data line 62. Particularly, the RF modem 20 sends a serial bit stream to the LAN controller 40 when receiving a packet, and receives a serial bit stream from the LAN controller 40 when sending a packet.

Operational States of the Hardware

The RF modem 20 is capable of cycling between the following basic states: sleep, listen, receive, and transmit; this may be controlled by software. These states are useful to provide a station that can both receive and transmit. Some additional states may be useful to allow for reduced power consumption, lower overhead, etc. Examples of possible additional states are preparing-to-transmit and preparing to change frequencies to a known frequency $f$.

III. Operation of the Communication System

Discussion in this section assumes that a packet will be segmented into N segments before it is transmitted, (i.e., an error detection code with N symbols per code word is used, where N is the number of channels used to transmit a packet) and that error correction techniques on the received segments would permit correction of data even if up to $e$ segments are not recoverable. The operations within the protocol engine 44 (FIG. 2) that form the segments, and the structure of each segment, will be discussed in Section IV.

IIIA. The Transmit Operation

Reference is made to FIG. 4, which is a flow chart of a transmit operation performed by a transmitting station. Operation to transmit a packet begins as illustrated in a box 100. Next, as illustrated in a box 102, the packet is encoded and arranged it into N segments. The encoding and arranging operations within the box 102 are described in detail with reference to FIG. 7. Next, operation moves to the box 104 in which an index $i$ is set equal to "0", and to a box 105 in which the index $i$ is incremented. Operation then moves to the box 106 in which the operation hops to channel $i$ and the first segment (segment$_1$) is transmitted on a first channel (channel$_1$). Operation then moves to the decision 108 in which the value of $i$ is tested to determine if it equals "N".

Because the value of the index i is "1" and N will likely be greater than one, the value of the index i may not equal "N" on this pass. Therefore operation will loop back to the box 105 to increment the index i. Operation continues to loop through the boxes 105, 106, and 108 until each of the N segments has been transmitted. Then operation exits from the box 108 and, as illustrated in the box 110, the transmit operation is complete. IIIB. The Receiving Operation A station waiting to receive a message continuously scans the first $p(1 \leq p < e+1)$ channels in a scanning operation, prepared to receive a segment on any of those p channels. Of course, the station has no foreknowledge of when packets may be transmitted. Once a signal has been acquired on any one scanned channel, the receiving station receives that segment and sequences through the remaining channels in the predetermined channel sequence, receiving the segments if possible, and finally applying error correction to the complete transmission. The packet will be recoverable by the error correction techniques even if up to e channels were corrupted due to interference or fading. As discussed earlier with reference to FIG. 3, the channel sequence may be selected in software, and may include any number of frequencies. For flexibility, the channel sequence can be programmable, as well as the number of frequencies that are scanned.

Reference is now made to FIG. 5, which is a flow chart of the scanning operation. Using this method, a station that wishes to receive packets will scan through the first $p(1 \leq p \leq e+1)$ frequencies of the predetermined channel sequence. The scanning operation starts in FIG. 5, beginning with a box 120 which indicates that the scanning operation starts. Operation then moves to a box 122 in which the index i is set equal to "0". Next, operation moves to a box 124 in which the index i is incremented. Next, in a box 126 the frequency synthesizer 28 (FIG. 2) hops to the first channel in the predetermined scanning sequence of p channels. Next, operation moves to a decision 128 which asks whether a valid transmission is detected on the first channel. If a signal is not acquired on that channel, then operation moves to a decision 130 in which the index i is compared with the value p, which is the number of scanned frequencies. If i is less than p, then operation returns to the box 124 in which the index i is incremented, and then the frequency hops to the next channel i. Until a valid transmission is detected on one of the channels scanned, operation loops through the box 126, 128, 130, and 124. The scanning operation may be repeated continuously during predetermined time periods, or it may alternate with other functions, such as transmission.

From the box 128, after a valid transmission is detected on channel i, operation moves to the box 132 which redirects the flow of operation to the receiving operation illustrated in FIG. 6. As illustrated in a box 132, the scanning operation is now complete.

In summary, the scanning operation scans through each of the p frequencies, and if a valid transmission is acquired on any of those channels, then operation shifts to the receiving operation. Scanning the first (e+1) channels is theoretically optimal, since if none of the first (e+1) channels is recoverable, then the transmission cannot be successfully reconstituted, as the error correction techniques can only recover if up to e channels out of the N are corrupted. However, in practice, the increase in system overhead is linearly related to the number of channels scanned. It can therefore be useful for some systems to scan less than e+1 channels.

Reference is now made to FIG. 6 which illustrates the receiving operation. Beginning in a block 150, the receiving operation starts, which assumes that a segment has been detected on channel i. Operation then moves to a box 152 in which an index j is set equal to the scanning index i. Next, in a box 154, the transmission on channel j is attempted to be received. Next in a decision 156, if a valid transmission is not detected on the channel j then it is marked as an erasure as illustrated in a box 158, and then in a box 160 the operation waits for the end of the segment j. Then, operation moves to a decision 162 which tests whether the receiving index j is equal to N, the number of segments. If not, then operation moves to a box 164 in which the receiving index j is incremented then to a box 165 in which the receiver hops to the next channel, and operation loops back to the box 154 in which the transmission is attempted to be received on the channel j. In the box 156, if a valid transmission is detected, then a box 166 illustrates that the segment is received. At this point, if the segment includes a destination address, it may be tested to determine if the destination address matches that of the receiving station. If it does match, or is ambiguous, then operation can continue. But if it does not match, then the receiving operation can be aborted. Operation then goes to the decision 162 which tests whether the receiving index j is equal to N, the maximum number of segments. Operation continues to loop through the box 164, 154, 156, and the intervening boxes, until in the box 162 the receiving index j equals N. Then, as illustrated in a box 168 the received segments are assembled, decoded, and error correction techniques are applied to recover the packet. The operation in the box 168 is described in more detail subsequently, with reference to FIG. 9. As illustrated in a box 170 the receiving operation is now complete.

The method of FIGS. 5 and 6 can also be stated as follows. If the scanning station first successfully detects a transmission on channel j it assumes that all the segments transmitted on channels 1, 2, ..., (j−1) were not recoverable (if any prior segment had been recoverable, the station would have detected it during the scanning process). The station receives the segment on channel j. In the case of fixed size packets, the station already knows the length of each segment. In the case of variable length packets, since the transmission is divided into N equal segments, the station now knows the segment length of each segment for that packet, since it has received the segment on channel $j$. In either case, let the length of each segment expressed by the time required for reception be $t_s$. The station can then cycle through the remaining channels j+1, j+2, ..., N, spending $t_s$ time units on each channel. The station can be assured that it will receive the segments on all non-impaired channels by changing channels after time $t_s$. If a segment on some channels $j(1 < j \leq N)$ cannot be detected and received due to a fade or interference, this does not hamper the reception of subsequent segments, since the station moves on to the next channel after time $t_s$. This technique of scanning the first several channels, receiving the first unimpaired segment, and thereby gaining the ability to recover all unimpaired segments enables the full theoretical power of a coded, slow frequency hopped system to be realized.

Listener/Recipient Procedure

The detailed Scanning/Receiving algorithms are presented in pseudo-code in Appendix A. The following discussion briefly describes this pseudo-code.

A station that wishes to receive packets will scan the first $p(1 \leq p \leq e+1)$ frequencies. (As noted earlier, it is feasible, but not useful, to scan more channels than e+1.) If the listening node detects a segment on any one of these channels, it knows a packet is being sent.

Suppose the frequency on which a segment is first detected is $f_j$, ($1 \leq j \leq p$). Since order of channel use is fixed, any previous segments must be erasures, since they were not received. Once the recipient has correctly received a single segment on one of the first $p$ frequencies, it knows a packet is on the way, and has no further need to scan. It also knows the length of the subsequent segments. The recipient node should therefore lock on to the segment $f_j$, receive it, and then receive the rest of the segments (from $j+1$ to N), by changing channels every $t_s$ time units.

IV. Encoding and Segmenting

Users can send arbitrary or fixed size packets. The entire packet is encoded, and the coded data is then arranged in a matrix with a number of columns equal to the number of channels. Each of the N columns of the matrix is then transmitted on a different frequency. The number of rows in the matrix depend on the packet length, and will be variable from packet to packet. The portion of the packet transmitted on a single frequency, which corresponds to a column of the matrix, is called a segment. The individual fields in each segment are explained in the section on Segment Structure, below.

At least two codes are used: a horizontal cross-segment code for interference rejection and immunity to fading and a vertical CRC (Cyclic Redundancy Code) to support erasure detection. Also, a vertical error correction code can be used to increase immunity to Gaussian noise. A CRC can be added to the packet before it is divided into segments.

IVA. Segmenting

Reference is now made to FIG. 7 which is a flow chart illustrating the segmenting operation that is performed on each packet. Within each functional block there is a diagram illustrating the effect upon the packet that this step creates. It should be remembered that the segmenting operations to be described are utilized in the preferred embodiment, and that other encoding and error correction methods can be used to create N segments.

Beginning in a box 180, the segmenting operation is started on the packet. In a first step in a box 182 the CRC (Cyclic Redundancy Code) is added to the packet. The effect of the CRC is to support overall error detection. In a second step in a box 184, data including the packet and the CRC code is divided evenly and arranged in a matrix of N–$e$ columns. In order to allow users to send arbitrary or fixed size packets, the number of rows in the matrix depend on the packet length, and will be variable from packet to packet.

In a third step in a box 186, $e$ columns of error correction coding are added to the columns, so that there are now N columns. The horizontal code is added to enhance interference rejection and immunity to fading.

In a fourth step in a box 188, a vertical CRC is added to support erasure detection, followed by optional vertical encoding to increase immunity to Gaussian noise. As a result, each column now includes vertically encoded segment data.

In a fifth and final step in a box 190, the preamble and header information are added to each segment, to finalize the segments for transmission. The segment structure is described in detail in section IVB below.

A box 192 illustrates that the segmenting operation is complete. The segmenting operation illustrated in FIG. 7 is performed within the LAN controller 40 (FIG. 2), particularly performed within the protocol engine 44.

IVB. Segment Structure

Reference is now made to FIG. 8. A segment 200 includes a non-data preamble 202, a segment header 203, and a segment data 204. These fields are described in detail in this section.

i) Preamble 202

The preamble field 202 includes a fixed pattern, determined by hardware requirements. Its purpose is to synchronize the hardware in a receiving station to receive data, which requires the following two operations: clock recovery and word-synchronization (aligning the hardware on a logical boundary in preparation for framing information)

The length of the preamble field 202 is determined by the hardware characteristics and by the algorithms executed by nodes when listening. The preamble must be sufficiently long to allow a scanning station to detect the transmission and then to begin receiving the transmitted packet. Following is the formula for preamble length, assuming the station scans $p$ ($1 \leq p \leq e+1$) channels:

$$\text{preamble length in units of time} \geq (p)*(T_{hop} + T_{valid-transmission-detection-time}),$$

where $T_{hop}$ = time necessary to hop to an arbitrary frequency from current frequency This preamble length allows the receiving station enough time to scan through all frequencies and then begin receiving a transmission.

ii) Header 203

The header 203 includes a framing field 205, a segment length field 206, a frequency designator field 208, a destination address 210, and a source address 212. These fields are described in detail below. It will be apparent to one skilled in the art that, in other embodiments, other useful fields may be added or some of the described fields may be omitted dependent upon the needs of the particular system.

iia) Framing Field 205

The framing field 205 signals the end of preamble 202 and the start of data. All bits in the segment 200 after the framing field 205 must be delivered to the protocol engine 44 (FIG. 2). The framing field 205 should have some tolerance to random errors like the preamble field 202. It is expected that the hardware in the LAN controller 40 will strip the framing bits off incoming segments, i.e., the framing bits will not be given to the protocol engine 44. A framing pulse should facilitate this operation.

iib) Segment Length 206

The segment length field 206 is used by the receiving station to determine end-of-segment. Preferably it is a 16-bit field with error correction by the receiving station, specifying the number of octets in the segment.

A flaming field like field 205 is not used to mark the end-of-segment, to allow for correct operation in the case where an interferer starts up part-way through the segment 200. In such a case, hardware using only a framing field at the end-of-segment would be unable to correctly determine end-of-segment, resulting in the loss not just of the segment, but potentially of the entire packet.

iic) Frequency Designator 208

The frequency designator field 208 is preferably an 8-bit error corrected field, specifying the frequency on which this segment 200 is being transmitted. It is provided to allow the protocol engine 44 to unambiguously determine which frequency the segment 200 was transmitted on, because in the presence of significant adjacent/alternate channel interference, the actual frequency of reception may not be a reliable indicator of this information.

iid) Destination Address Designator 210

The destination address designator field 210 is preferably a 16-bit error corrected field, containing a hashed form of the true destination address. (A typical form of the true destination address is a 48-bit IEEE address). The field 210 will be used by listening nodes to make a quick determination of whether the segment they are receiving is actually addressed to them. The reserved value of all 1's denotes the broadcast address. All nodes will accept a segment whose destination address designator is all 1's. Filtering on the full destination address will take place when the packet is reassembled and decoded, at which time packets not actually intended for a node may be discarded.

vi) Source Address Designator 212

The source address designator field 212 is a 16-bit error corrected field, containing a hashed form of the true destination address. It is provided for ease of network monitoring.

vi) Segment Data 204

The data field 204 is variable in length, and includes 1/N of the coded packet. Although variable, the length of the data field 204 has a maximum length determined by numerous factors, depending on the implementation, such as the number of frequencies in the predetermined channel sequence and the maximum length of time allowed at those frequencies. To obtain data transparency, bit-stuffing or similar techniques may be utilized.

V. Packet Recovery

Reference is made to FIG. 9 which is a flow chart illustrating the packet recovery operation. This flow chart assumes that a receiving operation has been performed, and that all recoverable segments have been received. Operations described therein are the reverse of the encoding operation described with reference to FIG. 7.

In a box 222, the received segments are arranged in columns like those illustrated in the box 188 in FIG. 7. In a box 224, the optional vertical error correction algorithms are applied to decode and correct errors within the segments. Next, in a box 226, the vertical CRC is used to detect segment erasures. Then, in a box 228, horizontal error correction is applied. Finally, in a box 230, the overall CRC is computed to detect remaining errors. If all of the above operations have been successful, then the packet will have been recovered correctly. However, if for some reason such as too many erasures, the packet could not be corrected, then it will not have been received correctly. In any event, a box 232 illustrates that the packet recovery operation is now complete.

From the above description, it will be apparent that the invention disclosed herein provides a novel and advantageous decentralized communication system. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

---

Appendix A

Scanning/Receiving Algorithm a) Scanning Algorithm
do forever
    for i:=1 to p    /*($1 \leq p \leq e + 1$)*/
        Go to Channel $f_i$
        if valid_transmission detected on this channel
        then
            receive this segment
            deduce segment length if not already known
            execute Receiving Algorithm
    end for loop
end of loop
End Scanning Algorithm
b) Receiving Algorithm
/*The scanning algorithm detected the first segment on frequency $f_i$*/
for j:=i+1 to N
    Hop to frequency $f_j$
    if valid transmission detected on this channel
    then
        Receive this segment
    else
        mark this frequency as an erasure
        Wait for rest of segment_length
end for loop
Apply vertical error correction and then compute CRC to detect
    additional erasures
Apply horizontal error correction
compute overall CRC
End Receiving Algorithm
c) Send Algorithm
for j:=1 to N
    Transmit segment on frequency $f_j$
    end of loop
    End Sender Algorithm

---

What is claimed is:

1. In a decentralized communication system for communicating between two or more of a plurality of stations each of which includes a transmitter and a receiver, a method for detecting and receiving a packet of data transmitted by an arbitrary transmitting station of said plurality of stations that first encodes and arranges the packet into a plurality of N segments, and then transmits the packets using frequency hopping in a predetermined channel sequence of N radio frequencies, said method comprising the steps of:

(a) in an arbitrary receiving station that is initially unsynchronized with said transmitting station, scanning a subset of frequencies of said N radio frequencies, said subset including a first plurality $p$ ($p<N$) of frequencies in said predetermined channel sequence wherein a scan time for each frequency of said subset is substantially less than the time necessary to receive a segment;

(b) testing for the presence of a transmission on each of said $p$ scanned frequencies;

(c) if a transmission is detected on one of said p scanned frequencies, then performing a receiving step (d), otherwise returning to step (a); and (d) if a transmission is detected in the step (c), then synchronizing the receiving station with the transmitted packet, receiving the segment, hopping to the next frequency in the predetermined channel sequence and receiving a segment on that channel and continuing to hop and receive until the $N^{th}$ segment has been received, otherwise returning to step (a).

2. The method of claim 1, further comprising a step (e) of arranging and decoding said received segments to recover said packet.

3. The method of claim 1 wherein each segment includes a preamble having a preamble time length $t_1$, and said seeps (a) and (b), scanning and testing are completed within a scanning and testing time period $t_2$ that is less than said preamble time length $t_1$.

4. The method of claim 2, wherein said packet is arranged by said transmitting station according to a predetermined protocol having N segments including a predetermined encoding in which the data in said packet is recoverable even if a number $e$ of said N segments are erased, and wherein in said step (a) the number $p$ is bounded on its upper limit by $e+1$.

5. The method of claim 4 wherein each segment includes a preamble having a preamble time length $t_1$, and said steps (a) and (b), scanning and testing are completed within a scanning and testing time period $t_2$ that is less than said preamble time length $t_1$.

6. The method of claim 1, wherein in the step (d), a destination address field of a received segment is tested to determine if the destination address matches that of the receiving station, and if the addresses do not match, then returning to step (a), otherwise continuing the receiving step (c).

7. The method of claim 1 wherein the receiving steps (a) through (d) described therein are performed by at least two of said plurality of stations.

8. A decentralized communication method for communicating a packet of data between a plurality of stations using frequency hopping in a predetermined channel sequence of N radio frequencies, said communication method comprising the steps of:

(a) in an arbitrary transmitting station, transmitting a packet including the steps of
  (a)(i) encoding and arranging said packet into a plurality of N segments according to a predetermined protocol and a predetermined encoding in which the data in said packet is recoverable even if a number $e$ of said N segments are erased, and
  (a)(ii) transmitting said N segments sequentially by hopping through said predetermined channel sequence of N radio frequencies, so that a first segment is transmitted on a first channel, a second segment is transmitted on a second channel, and so forth until the $N^{th}$ sediment is transmitted on an $N^{th}$ channel; and (b) in a plurality of receiving stations that are unsynchronized with said transmitting station, performing the steps of
  (b)(i) scanning a subset of frequencies of said N radio frequencies, said subset including a first plurality $p$ ($p<N$) of frequencies in said predetermined channel sequence wherein a scan time for each frequency of said subset is substantially less than the time necessary to receive a segment,
  (b)(ii) testing for the presence of a transmission on one of said $p$ scanned frequencies,
  (b)(iii) if a transmission is detected on one of said $p$ scanned frequencies, then synchronizing the receiving station with the transmitted packet, then receiving a segment in the frequency in which the transmission is first detected, hopping to the next frequency in the predetermined channel sequence and receiving a segment on that channel, and continuing until the $N^{th}$ segment has been received, and
  (b)(iv) decoding said received segments to recover the data packet.

9. The method of claim 8, wherein the step (a)(i) includes adding a preamble to each of the segments corresponding to the p frequencies, said preamble having a preamble time length $t_1$; and in the scanning step (b)(i) and the testing step (b)(ii), scanning and testing all $p$ frequencies occurs in a scanning and testing time length $t_2$ that is less than the preamble time length $t_1$.

10. The method of claim 8, wherein the step (a)(i) includes adding a preamble and a header to each of the segments, said preamble having a first time length $t_1$, said header information being indicative of the length of each segment and a destination address for said packet; and in the scanning step (b)(i) and the testing step (b)(ii), scanning and testing all $p$ frequencies occurs in a second time length $t_2$ that is less than the first time length 11. The method of claim 8 wherein the step (a)(i) includes adding a header to each of the segments, said header including information indicative of the length of each segment and a destination address that is intended for the packet.

12. The method of claim 11, wherein in the step (b)(iii), a destination address field of a received segment is tested to determine if the destination address matches that of the receiving station, and if the addresses do not match, then returning to step (a), otherwise continuing the receiving step (b)(iii).

13. The method of claim 5 wherein the step (b) is performed by at least two of said plurality of stations.

14. The method of claim 8 wherein before the transmitting step (a)(ii), the first channel is monitored, and if energy on said first channel is detected in a first amount sufficient to interfere with transmission, then waiting before performing step (a)(ii), otherwise continuing with step (a)(ii).

15. A scanning and receiving circuit for receiving a packet that has been arranged by a transmitting station according to a predetermined protocol having N segments including a predetermined encoding in which the data in said packet is recoverable even if a number $e$ of said N segments are erased, said segments being transmitted using N frequencies in a predetermined channel sequence, said scanning and receiving circuit comprising:

an antenna for receiving said plurality of frequencies;

a radio frequency (RF) modem coupled to said antenna, including a frequency synthesizer for producing a plurality of RF frequencies, a RF control unit coupled to the frequency synthesizer for selecting a radio frequency, said control unit including means for controlling the frequency synthesizer so that it serially scans $p$ ($1 \leq p \leq N$) frequencies of the N frequencies in said predetermined channel sequence in substantially less time than the time necessary to receive a segment; and a RF receiver including a detection circuit for testing each frequency as it is scanned for the existence of a transmission and a circuit responsive to said detection circuit for controlling the RF receiver and the RF frequency synthesizer to synchronize with the transmitted packet and to receive the detected segment and following transmitted segments.

16. The receiving circuit of claim 15 further comprising control logic coupled to the RF control unit for supplying control information thereto and for receiving status information therefrom, a protocol engine coupled to the control logic and the receiver, said protocol engine including program means for arranging received segments and decoding said received segments to recover the packet.

17. A frequency hopping communication unit for an unsynchronized station in a Local Area Network (LAN) that receives data and commands on a system bus, said frequency hopping communication unit comprising:

an antenna;

a radio frequency (RF) modem coupled to said antenna, including a frequency synthesizer for producing a plurality of RF frequencies, a RF transmitter, a RF receiver, and a RF control unit coupled to said RF transmitter and RF receiver, said RF control unit also coupled to the frequency synthesizer for selecting a radio frequency, said RF control unit including control means for controlling the frequency synthesizer so that it serially scans a selected number of frequencies in substantially less time than the time necessary to receive a segment;

a data bus coupled to the RF modem for supplying data to the transmitter and receiving data front the receiver; and a LAN controller coupled to the RF modem and the data bus, said LAN controller comprising control logic coupled to the RF control unit for supplying control information thereto and for receiving status information therefrom, and a protocol engine coupled to receive data and commands from the system bus, said protocol engine also coupled to the control logic and the data bus, said protocol engine for arranging said packet according to a predetermined protocol having N segments and a predetermined protocol having N segments including a predetermined encoding in which the data in said packet is recoverable even if a number $e$ of said N segments are erased, said protocol engine also for supplying the segments to the RF transmitter through the data bus and commands to the control logic.

18. The communication unit of claim 17 wherein the selected number of scanned frequencies is $p$, ($1 \leq p \leq e+1$), and the receiver includes means for testing each frequency as it is scanned for the existence of a transmission.

19. In a decentralized communication system for communicating between two or more of a plurality of unsynchronized stations, a method for detecting and receiving a packet of data transmitted by an arbitrary transmitting station of said plurality of stations using frequency hopping in a predetermined channel sequence of N radio frequencies including a first $p$ ($p<N$) frequencies, in which said transmitting station encodes and arranges the packet into a plurality of N segments including a first $p$ ($p<N$) segments each having a corresponding preamble time length $t_1$, comprising the steps of:

(a) in an arbitrary receiving station that is unsynchronized with said transmitting station, scanning and testing said first $p$ frequencies in a second time period $t_2$ that is less than the preamble time length $t_1$;

(b) if a transmission is detected on a first one of said $p$ frequencies, then performing a receiving step (c), otherwise returning to step (a); and (c) if a transmission is detected in the step (a), receiving the segment associated with said first one of said $p$ frequencies, hopping to the next frequency in the predetermined channel sequence and receiving a segment on that channel, and continuing to hop and receive until the $N^{th}$ segment has been received.

20. The method of claim 19, further comprising a step:

(d) arranging and decoding said received segments to recover said packet.

21. The method of claim 20, wherein said packet is arranged by said transmitting station according to a predetermined protocol having N segments including a predetermined encoding in which the data in said packet is recoverable even if the number $e$ of said N segments are erased, and wherein the number $p$ is bounded on its upper limit by $e+1$.

22. The method of claim 19, wherein at least one of said N segments includes a header including information indicative of the destination address for said packet, and further comprising a step in which the destination address of a received segment is tested to determine if the destination address matches that of the receiving station, and if the addresses do not match, then returning to step (a), otherwise continuing the receiving step (c).

23. The method of claim 19, wherein at least one or said $p$ segments includes information indicative of the length of each segment, and step (c) further includes detecting said segment length and utilizing it to receive each segment.

24. The method of claim 19 wherein the steps (a) through (c) described therein are performed by at least two of said plurality of stations.

* * * * *